United States Patent
Park

(10) Patent No.: US 10,919,506 B2
(45) Date of Patent: Feb. 16, 2021

(54) ELECTRIC BRAKE SYSTEM AND METHOD FOR CONTROLLING THE SAME

(71) Applicant: MANDO CORPORATION, Gyeonggi-do (KR)

(72) Inventor: In Hye Park, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 265 days.

(21) Appl. No.: 16/013,910

(22) Filed: Jun. 20, 2018

(65) Prior Publication Data
US 2018/0370508 A1    Dec. 27, 2018

(30) Foreign Application Priority Data
Jun. 21, 2017    (KR) .................. 10-2017-0078631

(51) Int. Cl.
*B60T 8/1766*    (2006.01)
*B60L 1/00*    (2006.01)
(Continued)

(52) U.S. Cl.
CPC ............ *B60T 8/1766* (2013.01); *B60L 1/003* (2013.01); *B60L 7/18* (2013.01); *B60L 7/26* (2013.01);
(Continued)

(58) Field of Classification Search
CPC ............. B60T 8/1766; B60T 2270/604; B60T 2270/608; B60T 2270/60; B60T 13/66;
(Continued)

(56) References Cited

U.S. PATENT DOCUMENTS

| | | | | |
|---|---|---|---|---|
| 6,132,015 A | * | 10/2000 | Aoyama ................... | B60T 8/00 303/152 |
| 9,266,511 B2 | | 2/2016 | Pihl et al. | |
| 2017/0096070 A1 | * | 4/2017 | Hyun ....................... | B60L 3/108 |

FOREIGN PATENT DOCUMENTS

| | | |
|---|---|---|
| CN | 106114484 | 11/2016 |
| CN | 106132794 | 11/2016 |

(Continued)

OTHER PUBLICATIONS

Office Action dated Jul. 13, 2020 for Chinese Patent Application No. 201810642832.1 and its English machine translation by Google Translate.

*Primary Examiner* — Adam R Mott
(74) *Attorney, Agent, or Firm* — Ladas & Parry, LLP

(57) ABSTRACT

An electric brake system and a method for controlling the same are disclosed. The electric brake system includes a pedal sensor configured to sense a pedal effort, a calculator configured to calculate a target brake pressure based on the sensed pedal effort, a first hydraulic circuit configured to form a brake pressure of at least one rear wheel or form a rear-wheel regenerative braking pressure, a second hydraulic circuit configured to form a brake pressure of at least one front wheel, and a controller configured to perform rear-wheel regenerative braking during deceleration of a vehicle, perform cooperative control of a front-wheel hydraulic pressure when a rear-wheel regenerative braking pressure reaches a maximum regenerative braking pressure, increase the front-wheel hydraulic pressure to a target brake pressure when the rear-wheel regenerative braking is released, and then increase a rear-wheel hydraulic pressure.

13 Claims, 10 Drawing Sheets

(51) Int. Cl.
 *B60L 7/18* (2006.01)
 *B60L 15/20* (2006.01)
 *B60L 7/26* (2006.01)
(52) U.S. Cl.
 CPC ....... *B60L 15/2018* (2013.01); *B60L 2250/26* (2013.01); *B60T 2270/60* (2013.01); *B60T 2270/604* (2013.01); *B60T 2270/608* (2013.01)
(58) Field of Classification Search
 CPC . B60T 17/22; B60T 8/26; B60T 8/267; B60T 8/30; B60T 8/303; B60T 8/306; B60L 1/003; B60L 7/18; B60L 15/2018; B60L 7/26; B60L 2250/26
 See application file for complete search history.

(56) References Cited

FOREIGN PATENT DOCUMENTS

CN      106585389       4/2017
KR   10-2016-0071850    6/2016

\* cited by examiner

ELECTRIC BRAKE SYSTEM AND METHOD FOR CONTROLLING THE SAME

CROSS-REFERENCE TO RELATED APPLICATION

This application is based on and claims priority under 35 U.S.C. § 119 to Korean Patent Application No. 10-2017-0078631, filed on Jun. 21, 2017 in the Korean Intellectual Property Office, the disclosure of which is incorporated by reference in its entirety.

BACKGROUND

1. Field

Embodiments of the present disclosure relate to an electric brake system, and more particularly to an electric brake system configured to perform rear-wheel regenerative braking cooperative control, and a method for controlling the same.

2. Description of the Related Art

A regenerative braking system is a system that produces electrical energy by operating a generator by inertia allowing a vehicle to drive. Generally, the regenerative braking system acts as a system linked to one or more brakes.

The most important role of the regenerative braking system is braking. Although energy can be regenerated during regenerative braking in which a motor operates as a generator, it is difficult to produce brake force desired by a vehicle driver only using the brake of the regenerative braking system. In order to address this issue, many developers and companies are conducting intensive research into a regenerative braking cooperative control brake system that is implemented by a combination of an integrated brake controller capable of producing brake force by cooperating with a hydraulic brake and a hydraulic-pressure supply device.

For example, when the driver depresses a brake pedal, the regenerative braking cooperative control brake system may detect how much braking force is desired by the driver by detecting how fast the driver depresses the brake pedal and how deep the driver depresses the brake pedal, may use a maximum of the regenerative braking cooperative control brake within the range of brake force, and may supplement the remaining insufficient parts using a hydraulic brake.

SUMMARY

Therefore, it is an aspect of the present disclosure to provide a method for controlling and distributing braking pressure of front wheels and braking pressure of rear wheels for use in a rear-wheel regenerative braking vehicle.

It is another aspect of the present disclosure to provide a technology for preventing front wheels or rear wheels from being overbraked, resulting in a stable posture of the vehicle.

Additional aspects of the invention will be set forth in part in the description which follows and, in part, will be obvious from the description, or may be learned by practice of the invention.

In accordance with an aspect of the present disclosure, an electric brake system includes: a pedal sensor configured to sense a pedal effort; a calculator configured to calculate a target brake pressure based on the sensed pedal effort; a first hydraulic circuit configured to form a brake pressure of at least one rear wheel or form a rear-wheel regenerative braking pressure; a second hydraulic circuit configured to form a brake pressure of at least one front wheel; and a controller configured to perform rear-wheel regenerative braking during deceleration of a vehicle, perform cooperative control of a front-wheel hydraulic pressure when a rear-wheel regenerative braking pressure reaches a maximum regenerative braking pressure, increase the front-wheel hydraulic pressure to a target brake pressure when the rear-wheel regenerative braking is released, and then increase a rear-wheel hydraulic pressure.

The controller may increase the front-wheel hydraulic pressure to a first threshold value during the front-wheel hydraulic pressure cooperative control.

During the front-wheel hydraulic pressure cooperative control, the controller may increase the front-wheel hydraulic pressure so as to form the amount of a braking torque corresponding to a difference between a braking torque based on driver's deceleration intention and a maximum regenerative braking torque.

The controller may increase the front-wheel hydraulic pressure to the target brake pressure, and may then increase the rear-wheel hydraulic pressure to the target brake pressure.

The controller may perform deceleration of the vehicle by controlling only the front-wheel hydraulic pressure when variation of a sensed driver's braking pressure is higher than a second threshold value.

The controller may perform the rear-wheel regenerative braking when the front-wheel hydraulic pressure reaches a third threshold value.

When the rear-wheel regenerative braking pressure reaches the maximum regenerative braking pressure, the controller may reduce the front-wheel hydraulic pressure in a manner that a sum of a front-wheel torque and a maximum regenerative brake torque is identical to a target brake torque based on a target braking pressure of the driver.

When the front-wheel hydraulic pressure reaches a fourth threshold value, the controller may increase the rear-wheel hydraulic pressure to the target brake pressure, and may reduce the front-wheel hydraulic pressure to the target brake pressure.

The controller may allow a consumption time needed to increase the rear-wheel hydraulic pressure to the target brake pressure to be identical to another consumption time needed to reduce the front-wheel hydraulic pressure to the target brake pressure.

The controller may prevent the rear-wheel regenerative braking.

During release of the rear-wheel regenerative braking, the controller may increase the front-wheel hydraulic pressure to a fifth threshold value higher than the target brake pressure, and may then increase the rear-wheel hydraulic pressure.

The fifth threshold value may be a target brake pressure based on driver's deceleration intention to be predicted at an end point of the rear-wheel regenerative braking.

The controller may increase the rear-wheel hydraulic pressure to the target brake pressure based on the driver's deceleration intention, and may then synchronize the front-wheel hydraulic pressure and the rear-wheel hydraulic pressure.

In accordance with another aspect of the present disclosure, an electric brake control method includes sensing a pedal effort; calculating a target brake pressure based on the sensed pedal effort; and controlling either a first hydraulic circuit that forms a brake pressure of at least one rear wheel or forms a rear-wheel regenerative braking pressure, or a second hydraulic circuit that forms a brake pressure of at least one front wheel. The electric brake control method includes performing rear-wheel regenerative braking during deceleration of a vehicle, and performing cooperative control of a front-wheel hydraulic pressure when the rear-wheel regenerative braking pressure reaches a maximum regenerative braking pressure; increasing the front-wheel hydraulic pressure to a target brake pressure based on driver's deceleration intention when the rear-wheel regenerative braking is released; and increasing a rear-wheel hydraulic pressure when the front-wheel hydraulic pressure increases to the target brake pressure based on the driver's deceleration intention.

The increasing the rear-wheel hydraulic pressure when the front-wheel hydraulic pressure increases to the target brake pressure based on the driver's deceleration intention may include synchronizing the front-wheel hydraulic pressure and the rear-wheel hydraulic pressure by increasing the rear-wheel hydraulic pressure to the target brake pressure based on the driver's deceleration intention.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
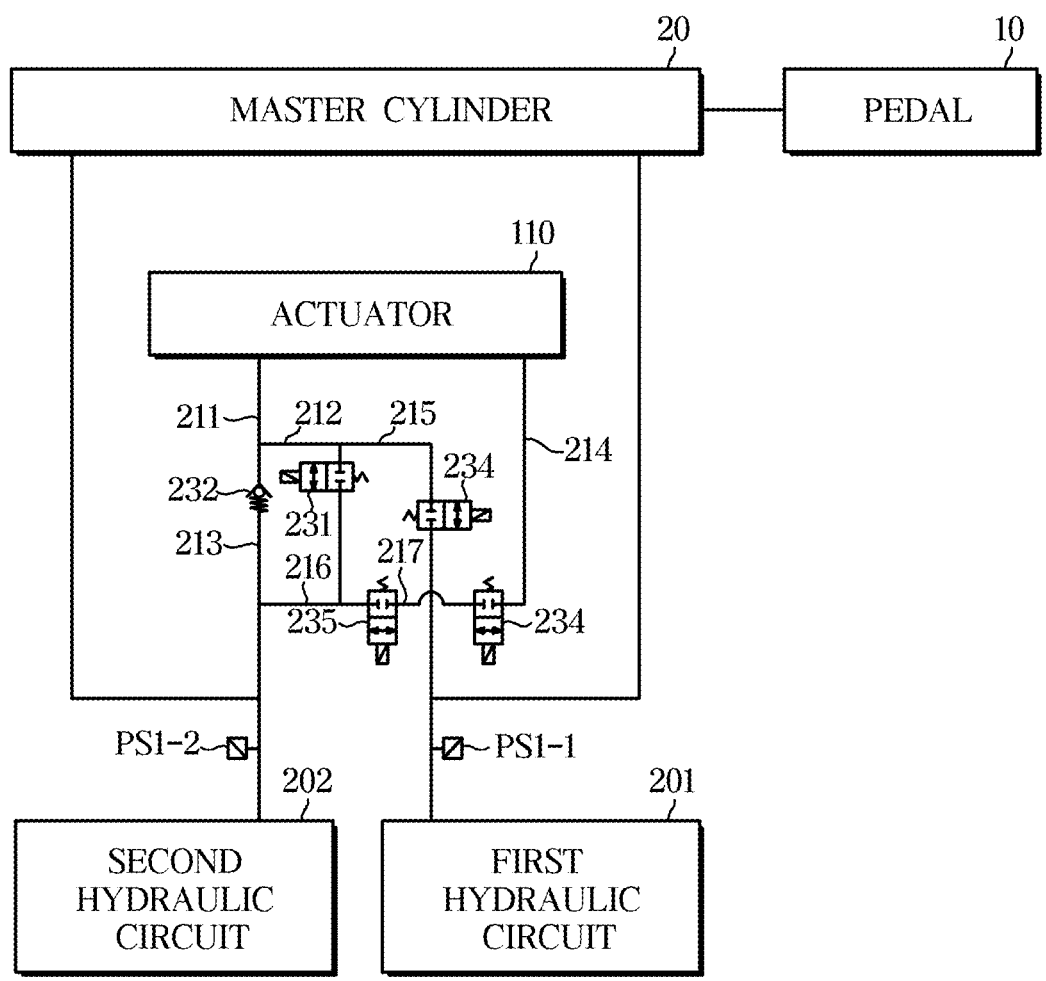
FIG. 1 is a block diagram illustrating an electric brake system based on regenerative cooperative control according to an embodiment of the present disclosure.

Reference will now be made in detail to the embodiments of the present disclosure, examples of which are illustrated in the accompanying drawings, wherein like reference numerals refer to like elements throughout. The scope or spirit of the present disclosure is not limited to the embodiments and may be realized in various other forms. The embodiments are only provided to more completely illustrate the present disclosure and to enable a person having ordinary skill in the art to fully understand the scope of the present disclosure. In the drawings, sizes and shapes of elements may be exaggerated or reduced for convenience and clarity of description.

Figure 2:
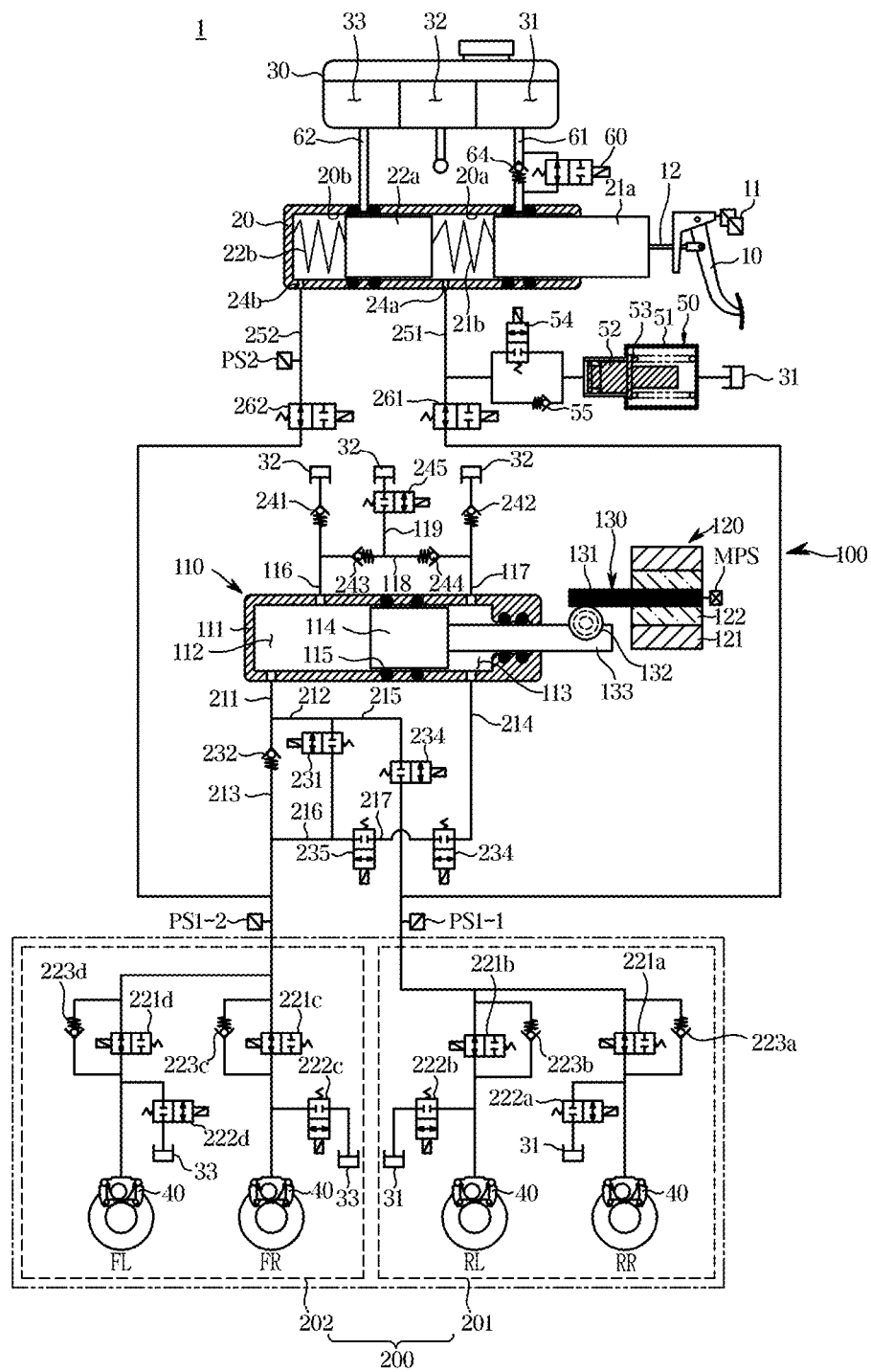
FIG. 2 is a hydraulic circuit diagram illustrating a non-braking state of the electric brake system according to an embodiment of the present disclosure.
Figure 3:
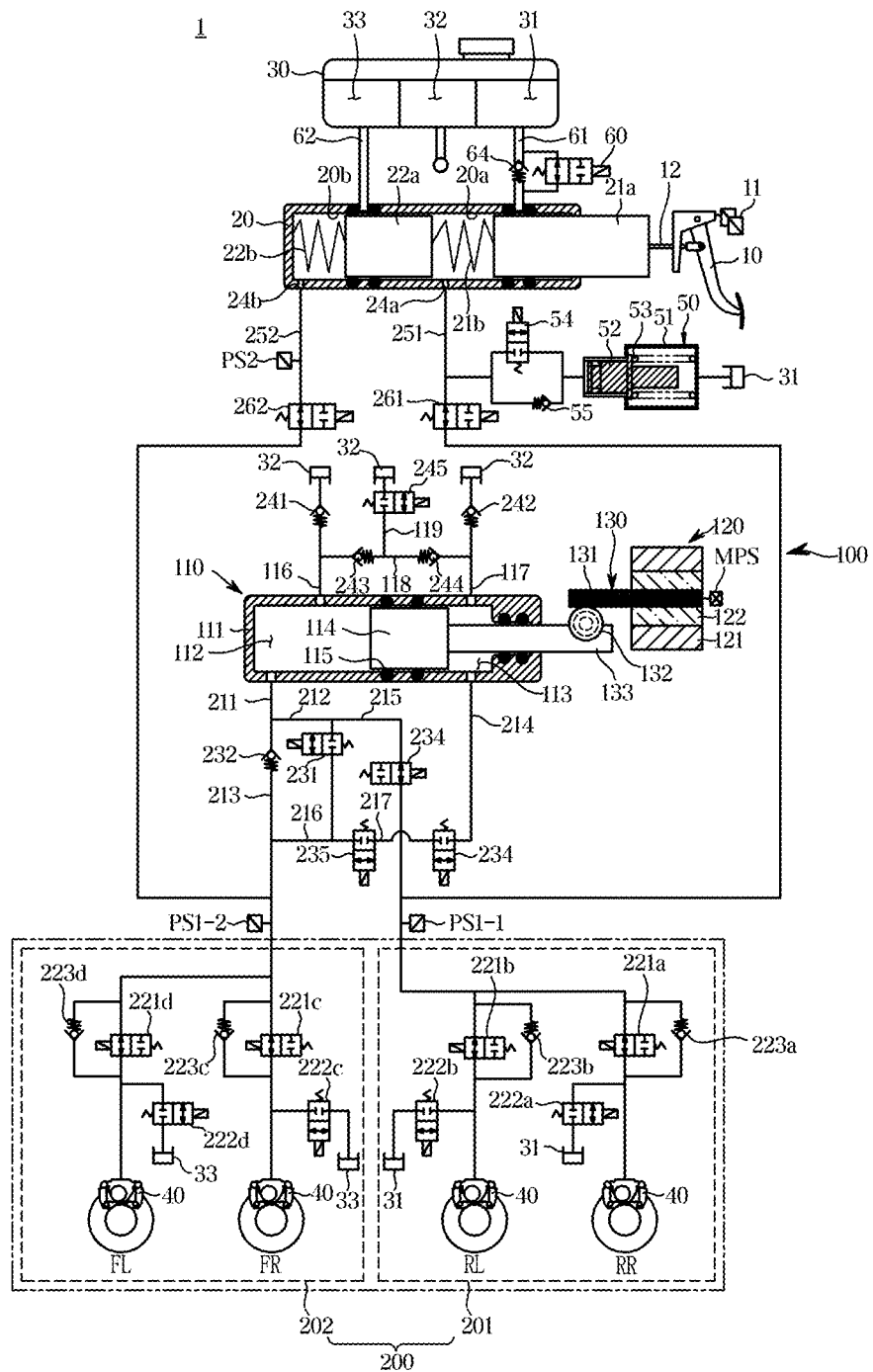
FIG. 3 is a hydraulic circuit diagram illustrating a rear-wheel regenerative braking cooperative control operation of the electric brake system according to an embodiment of the present disclosure.

FIG. 1 is a block diagram illustrating an electric brake system based on regenerative cooperative control according to an embodiment of the present disclosure. FIG. 2 is a hydraulic circuit diagram illustrating a non-braking state of the electric brake system according to an embodiment of the present disclosure. FIG. 3 is a hydraulic circuit diagram illustrating a rear-wheel regenerative braking cooperative control operation of the electric brake system according to an embodiment of the present disclosure.

Referring to FIGS. 1 to 3, the electric brake system 1 may include a master cylinder 20 to generate hydraulic pressure (hydraulic fluid pressure), a reservoir 30 coupled to the upper portion of the master cylinder 20 to store a hydraulic fluid, an input rod 12 to apply pressure to the master cylinder 20 according to foot force applied to a brake pedal 10, one or more wheel cylinders 40 to perform braking of the respective wheels RR, RL, FR, and FL when the hydraulic fluid in the reservoir 20 is transferred thereto, a pedal displacement sensor 11 to sense displacement of the brake pedal 10, and a simulation device 50 to provide reaction force corresponding to a pedal effort of the brake pedal 10.

The master cylinder 20 may be configured to have at least one chamber, thereby generating hydraulic pressure. For example, the master cylinder 20 may include a first master chamber 20a and a second master chamber 20b.

The first master chamber 20a may include a first piston 21a connected to the input rod 12, and the second master chamber 20b may include a second piston 22a. The first master chamber 20a may communicate with a first hydraulic port 24a through which oil is input and output. The second master chamber 20b may communicate with a second hydraulic port 24b through which oil is input and output. For example, the first hydraulic port 24a may be connected to a first backup passage 251, and the second hydraulic port 24b may be connected to a second backup passage 252.

The master cylinder 20 provided with two master chambers 20a and 20b may be designed to secure safety in the event of malfunction. For example, the first master chamber 20a of the two master chambers 20a and 20b may be connected to the rear right wheel RR and the rear left wheel RL of the vehicle through the first backup passage 251, and the other master chamber 20b may be connected to the front right wheel FR and the rear left wheel RL of the vehicle through the second backup passage 252.

A first spring 21b may be disposed between the first piston 21a and the second piston 22a of the master cylinder 20, and a second spring 22b may be disposed between the second piston 22a and the end of the master cylinder 20.

The first spring 21b and the second spring 22b may be compressed by the first piston 21a and the second piston 22a that move in response to change of displacement of the brake pedal 10, so that the first spring 21b and the second spring 22 may store elastic force generated by compression thereof. When force pushing the first piston 21a becomes weaker than the elastic force, the elastic force stored in the first and second springs 21b and 22b pushes the first and second pistons 21a and 22a back to original positions thereof.

The input rod 12 to pressurize the first piston 21a of the master cylinder 20 may closely contact the first piston 21a. That is, a gap between the master cylinder 20 and the input rod 12 may not be present. Therefore, the brake pedal 10 depressed by the driver may directly pressurize the master cylinder 20 without a pedal free stroke region.

The first master chamber 20a may be connected to the reservoir 30 through a first reservoir passage 61, and the second master chamber 20b may be connected to the reservoir 30 through a second reservoir passage 62.

The first reservoir passage 61 may be provided with a check valve 64 that allows oil to flow from the reservoir 30 to the first master chamber 20a and prevents oil from flowing from the first master chamber 20a to the reservoir 30.

A front end and a rear end of the check valve 64 of the first reservoir passage 61 may be connected to each other through a bypass passage 63. The bypass passage 63 may be provided with an inspection valve 60.

The inspection valve 60 may be implemented as a bidirectional control valve to control flow of oil between the reservoir and the master cylinder 20. The inspection valve 60 may be implemented as a normally opened (NO) solenoid valve that remains opened in a normal state and then closed upon receiving a closing signal from an electric control unit (ECU). The inspection valve 60 may detect the presence or absence of a leak of a simulator valve 54. This inspection mode may be carried out in a predetermined condition through the ECU during traveling or stopping of the vehicle.

The reservoir 30 may include three reservoir chambers 31, 32, and 33. For example, three reservoir chambers 31, 32, and 33 may be arranged parallel to one another in one column.

Referring to FIG. 2, the first reservoir chamber 31 may be connected to the first master chamber 20a of the master cylinder 20, the wheel cylinders 40, and the simulation device 50. That is, the first reservoir chamber 31 may be connected to the first master chamber 20a through the first reservoir passage 61, and may be connected to the wheel cylinder 40 of the first hydraulic circuit 201 in which two wheel cylinders FR and RL from among four wheel cylinders 40 are arranged.

Connection between the first reservoir chamber 31 and the first master chamber 20a may be controlled by the check valve 64 and the inspection valve 60, and connection between the first reservoir chamber 31 and the simulation device 50 may be controlled by the simulator valve 54 and a simulator check valve 55. Connection between the first reservoir chamber 31 and the wheel cylinders 40 may be controlled by first and second outlet valves 222a and 222b.

The second reservoir chamber 32 may be connected to a hydraulic-pressure supply device 100 to be described later. The second reservoir chamber 32 may be connected to a first pressure chamber 112 and a second pressure chamber 113 of a hydraulic-pressure providing unit 110. In more detail, the second reservoir chamber 32 may be connected to the first pressure chamber 112 through a first dump passage 116, and may be connected to the second pressure chamber 113 through a second dump passage 117.

The third reservoir chamber 33 may be connected to the second master chamber 20b of the master cylinder 20 and the wheel cylinders 40. That is, the third reservoir chamber 33 may be connected to the second master chamber 20b through the second reservoir passage 62, and may be connected to the wheel cylinders 40 of the second hydraulic circuit 202 in which two other wheel cylinders FR and FL from among four wheel cylinders 40 are arranged. Connection between the third reservoir chamber 33 and the wheel cylinders 40 may be controlled by third and fourth outlet valves 222c and 222d.

The reservoir 30 may be provided in a manner that the second reservoir chamber 32 connected to the hydraulic-pressure supply device 100 is separated from the first reservoir chamber 31 connected to the first master chamber 20a and the third reservoir chamber 33 connected to the second master chamber 20b. In more detail, assuming that the reservoir chamber for supplying oil to the hydraulic-pressure supply device 100 is identical to the reservoir chamber for supplying oil to the master chambers 20a and 20b, the reservoir 20 having difficulty in supplying oil to the hydraulic-pressure supply device 100 may also have difficulty in supplying oil to the master chambers 20a and 20b. In order to address this issue, there is a need to separate the second reservoir chamber 32 from the first reservoir chamber 31 and the third reservoir chamber 33.

Therefore, since the reservoir 30 may be provided in a manner that the second reservoir chamber 32 is separated from the first and third reservoir chambers 31 and 33, the reservoir 30 may normally supply oil to the first and second master chambers 20a and 20b even in an emergency situation in which oil is insufficiently supplied to the hydraulic-pressure supply device 100, resulting in emergency braking of the vehicle.

Likewise, the reservoir 30 may be provided in a manner that the first reservoir chamber 31 connected to the first master chamber 20a is separated from the third reservoir chamber 33 connected to the second master chamber 20b. In more detail, assuming that the reservoir chamber for supplying oil to the first master chamber 20a is identical to the reservoir chamber for supplying oil to the second master chamber 20b, the reservoir 20 having difficulty in supplying oil to the first master chamber 20a may also have difficulty in supplying oil to the second master chamber 20b. In order to address this issue, there is a need to separate the first reservoir chamber 31 and the third reservoir chamber 33 from each other.

Therefore, since the reservoir 30 is provided in a manner that the first reservoir chamber 31 and the third reservoir chamber 33 are separated from each other, the reservoir 30 may normally supply oil to the second master chambers 20b even in an emergency situation in which oil is insufficiently supplied to the first master chamber 20a, such that braking pressure can be normally generated by at least two of the four wheel cylinders 40.

The simulation device 50 may be connected to a first backup passage 251 so as to provide reaction force corresponding to a pedal effort of the brake pedal 10. The simulation device 50 may provide reaction force to compensate for a pedal effort of the brake pedal 10 depressed by the driver, such that braking force can be precisely adjusted as intended by the driver.

Referring to FIG. 2, the simulation device 50 may include a simulation chamber 51 to store oil discharged from the first hydraulic port 24a of the master cylinder 20, a reaction force piston 52 included in the simulation chamber 51, a pedal simulator provided with a reaction force spring 53 elastically supporting the reaction force piston 52, and a simulator valve 54 connected to a front end of the simulation chamber 51.

The simulation chamber 51 is always filled with oil. Therefore, frictional force of the reaction force piston 52 is minimized during operation of the simulation device 50, such that durability of the simulation device 50 can be improved and foreign materials from the outside can be prevented from flowing into the simulation chamber 50.

The reaction force piston 52 and the reaction force spring 53 may be installed to have a predetermined range of displacement within the simulation chamber 51 by oil flowing into the simulation chamber 51.

The simulator valve 54 may connect the master cylinder 20 to the front end of the simulation chamber 51, and the rear end of the simulation chamber 51 may be connected to the reservoir 31. Therefore, the simulation chamber 51 may receive oil from the reservoir 31 even when the reaction force piston 52 moves back to the original position thereof, such that the simulation chamber 51 may always be fully filled with oil.

The simulator valve 54 may be implemented as a normally closed (NC) solenoid valve that remains closed in a normal state. The simulator valve 54 is opened when the driver applies a pedal effort to the brake pedal 10 by depressing the brake pedal 10, such that oil stored in the simulation chamber 51 may flow into the reservoir 31.

A simulator check valve 55 may be connected in parallel to the simulator valve 54. When the driver takes a foot off the brake pedal 10 to release the pedal effort applied to the brake pedal 10, oil is supplied to the simulation chamber 51 via the simulation check valve 55, such that pressure of the pedal simulator can rapidly return.

The electric brake system 1 according to the embodiment of the present disclosure may include a hydraulic-pressure supply device 100, a hydraulic control unit 200, a first cut valve 261, a second cut valve 262, and an electric control unit (ECU). The hydraulic-pressure supply device 100 may mechanically operate by receiving an electrical signal indicating the driver's braking intention from the pedal displacement sensor 11. The hydraulic control unit 200 may include first and second hydraulic circuits 201 and 202, each of which includes two wheels (two of FR, FL, RR, and RL) and controls flow of hydraulic pressure supplied to the wheel cylinders 40 disposed in the two wheels (two of FR, FL, RR, and RL). The first cut valve 261 may be disposed in the first backup passage 251 configured to interconnect the first hydraulic port 24a and the first hydraulic circuit 201 of the master cylinder, and may control flow of hydraulic pressure. The second cut valve 262 may be disposed in the second backup passage 252 configured to interconnect the second hydraulic port 24b and the second hydraulic circuit 202 of the master cylinder, and may control flow of hydraulic pressure. The ECU may control the hydraulic-pressure supply device 100 and valves 54, 60, 221a, 221b, 221c, 221d, 222a, 222b, 222c, and 222d based on hydraulic pressure information and pedal displacement information.

The hydraulic-pressure supply device 100 may include a hydraulic-pressure providing unit 110 to supply oil pressure to wheel cylinders 40, a motor to produce rotational force according to an electrical signal from the pedal displacement sensor 11, and a power switching unit 130 to convert rotational motion of the motor 50 into rectilinear motion and to provide the rectilinear motion to the hydraulic-pressure providing unit 110. In this case, the hydraulic-pressure providing unit 110 may also operate by pressure supplied from a high-pressure accumulator, instead of using driving force supplied from the motor 120.

The hydraulic-pressure providing unit 110 may include a cylinder block 111, a hydraulic piston 114, one or more sealing members 115 (including 115a and 115b), and a drive shaft 133. The cylinder block 111 may have a pressure chamber to store oil supplied thereto. The hydraulic piston 114 may be provided in the cylinder block 111. The sealing member 115 (including 115a and 115b) may be disposed between the hydraulic piston 114 and the cylinder block 111 to seal the pressure chamber. The drive shaft 133 may be connected to the rear end of the hydraulic piston 114 to transfer power from the power switching unit 130 to the hydraulic piston 114.

The pressure chamber may include a first pressure chamber 112 located at a front side (i.e., a forward direction, see a left side of FIG. 2) of the hydraulic piston 114, and a second pressure chamber 113 located at a rear side (i.e., a backward direction, see a right side of FIG. 2) of the hydraulic piston 114. That is, the first pressure chamber 112 may be divided by the cylinder block 111 and the front end of the hydraulic piston 114, and may have a volume changeable according to movement of the hydraulic piston 114. The second pressure chamber 113 may be divided by the cylinder block 111 and the rear end of hydraulic piston 114, and may have a volume changeable according to movement of the hydraulic piston 114.

The first pressure chamber 112 may be connected to a first hydraulic passage 211 through a first communication hole 111a formed at a rear side of the cylinder block 111. The second pressure chamber 113 may be connected to a fourth hydraulic passage 214 through a second communication hole 111b formed at a front side of the cylinder block 111.

The first hydraulic passage 211 may connect the first pressure chamber 112 to the first and second hydraulic circuits 201 and 202. The first hydraulic passage 211 may be divided into a second hydraulic passage 212 communicating with the first hydraulic circuit 201 and a third hydraulic passage 213 communicating with the second hydraulic circuit 202. The fourth hydraulic passage 214 may connect the second pressure chamber 113 to the first and second hydraulic circuits 201 and 202. The fourth hydraulic passage 214 may be divided into a fifth hydraulic passage 215 communicating with the first hydraulic circuit 201 and a sixth hydraulic passage 216 communicating with the second hydraulic circuit 202.

The sealing member 115 may include a piston sealing member 115a and a drive-shaft sealing member 115b. The piston sealing member 115a may be disposed between the hydraulic piston 114 and the cylinder block 111 to seal a gap between the first pressure chamber 112 and the second pressure chamber 113. The drive-shaft sealing member 115b may be disposed between the drive shaft 113 and the cylinder block 111 to seal a gap between the second pressure chamber 113 and the opening of the cylinder block 111. That is, hydraulic pressure of the first pressure chamber 112 affected by forward or backward movement of the hydraulic piston 114 may be blocked by the piston sealing member 115a, so that the resultant hydraulic pressure of the first pressure chamber 112 can be transmitted to the first and fourth hydraulic passages 211 and 214 without leaking to the second pressure chamber 113. Hydraulic pressure of the second pressure chamber 113 affected by forward or backward movement of the hydraulic piston 114 may be blocked by the drive-shaft sealing member 115b, so that the resultant hydraulic pressure of the second pressure chamber 113 may not leak to the cylinder block 111.

The first pressure chamber 112 may be connected to the second reservoir chamber 32 through the first dump passage 116, such that the first pressure chamber 112 may receive oil from the second reservoir chamber 32 and store the received oil or may transmit oil of the first pressure chamber 112 to the second reservoir chamber 32. The second pressure chamber 113 may be connected to the second reservoir chamber 32 through the second dump passage 117, such that the second pressure chamber 113 may receive oil from the second reservoir chamber 32 and store the received oil or may transmit oil of the second pressure chamber 113 to the second reservoir chamber 32. For example, the first pressure chamber 112 may be connected to the first dump passage 116 through a third communication hole 111c formed at the front side thereof. The second pressure chamber 113 may be connected to the second dump passage 117 through a fourth communication hole 111d formed at the rear side thereof. The first dump passage 116 and the second dump passage 117 may communicate with each other through a third dump connection passage 118, and the third dump connection passage 118 may be connected to the second reservoir chamber 32 through a fourth dump passage 119. For convenience of description and better understanding of the present disclosure, the second reservoir chamber 32 connected to the dump passages 116, 117, and 1119 will hereinafter be referred to as a reservoir 30.

Referring back to FIG. 2, passages 211, 212, 213, 214, 215, 216, 217, and 218 connected to the first and second pressure chambers 112 and 113, and valves 231, 232, 233, 234, 235, 241, 242, 243, 244, and 245 connected to the first and second pressure chambers 112 and 113 will hereinafter be described.

The second hydraulic passage 212 may communicate with the first hydraulic circuit 201, and the third hydraulic passage 213 may communicate with the second hydraulic circuit 202. Therefore, hydraulic pressure may be transmitted to the first and second hydraulic circuits 201 and 202 by forward movement of the hydraulic piston 114.

The electric brake system 1 according to the embodiment of the present disclosure may include a first control valve 232 that is provided in the third hydraulic passage 213 to control flow of oil.

The first control valve 232 may be implemented as a check valve that allows oil to flow from the first pressure chamber 112 to the second hydraulic circuit 202 and prevents oil from flowing from the second hydraulic circuit 202 to the first pressure chamber 112.

The second hydraulic passage 212 may be divided into the fourth hydraulic passage 215 and the sixth hydraulic passage 218 so that the second hydraulic passage 212 may communicate with both the first hydraulic circuit 201 and the second hydraulic circuit 202.

For example, the fifth hydraulic passage 215 branched from the fourth hydraulic passage 214 may communicate with the first hydraulic circuit 201, and the sixth hydraulic passage 215 branched from the fourth hydraulic passage 214 may communicate with the second hydraulic circuit 202. Therefore, by backward movement of the hydraulic piston 114, hydraulic pressure may be transmitted to both the first hydraulic circuit 201 and the second hydraulic circuit 202.

The electric brake system 1 according to the embodiment of the present disclosure may include a second control valve 231 embedded in the fourth hydraulic passage 215 to control flow of oil, and a third control valve 232 embedded in the sixth hydraulic passage 218 to control flow of oil.

The second control valve 231 and the third control valve 233 may be implemented as normally opened (NO) solenoid valves that remain opened in a normal state and then closed upon receiving a closing signal from the ECU.

The electric brake system 1 according to the embodiment of the present disclosure may include first and second dump valves 241 and 242, third and fourth dump valves 243 and 244, and a fifth dump valve 245. The first dump valve 241 may be provided in the first dump passage 116 to control flow of oil. The second dump valve 242 may be provided in the second dump passage 117 to control flow of oil. The third and fourth dump valves 243 and 244 may be provided in the third dump connection passage 118 to control flow of oil. The fifth dump valve 245 may be provided in the fourth dump passage 119 to control flow of oil.

In other words, the first dump valve 241 may be implemented as a check valve that allows oil to flow from the reservoir 30 to the first pressure chamber 112 and prevents oil from flowing from the first pressure chamber 112 to the reservoir 30. The second dump valve 242 may be implemented as a check valve that allows oil to flow from the reservoir 30 to the second pressure chamber 113 and prevents oil from flowing from the second pressure chamber 113 to the reservoir 30.

The third dump valve 243 may be implemented as a check valve that allows oil to flow from the first pressure chamber 112 to the reservoir 30 and prevents oil from flowing from the reservoir 30 to the first pressure chamber 112. The fourth dump valve 244 may be implemented as a check valve that allows oil to flow from the second pressure chamber 113 to the reservoir 30 and prevents oil from flowing from the reservoir 30 to the second pressure chamber 113. The third dump valve 243 and the fourth dump valve 244 are arranged to face each other, such that flow of oil between the first pressure chamber 112 and the second pressure chamber 113 may be restricted.

The fifth dump valve 245 may be implemented as a solenoid valve to control bidirectional flow of oil between the reservoir 30 and the first and second pressure chambers 112 and 113, such that the fifth dump valve 245 implemented as a solenoid valve may be provided in the fourth dump passage 119. The fifth dump valve 245 may be implemented as a normally opened (NO) solenoid valve that remains closed in a normal state and then opened upon receiving an opening signal from the ECU.

The fifth dump valve 245 may recognize the position of an origin point of the hydraulic piston 114 included in the cylinder block 111 of the hydraulic-pressure providing unit 110, and may recognize the position of a motor along with a position sensor (not shown) that is opened only prior to initial driving of the hydraulic-pressure supply device 100, such that the fifth dump valve 245 may allow the ECU (not shown) to correctly control stroke of the hydraulic piston 114. The fifth dump valve 245 may remain closed in an operation state of the hydraulic-pressure supply device 100.

The hydraulic-pressure providing unit 110 of the electric brake system 1 according to the embodiment of the present disclosure may operate in a double-acting manner. That is, hydraulic pressure produced in the first pressure chamber 112 by forward movement of the hydraulic piston 114 may be transmitted to the first hydraulic circuit 202 through the third hydraulic passage 213, thereby operating the wheel cylinders 40 installed in the front right wheel FR and the front left wheel FL. In addition, hydraulic pressure produced in the first pressure chamber 112 by forward movement of the hydraulic piston 114 may be transmitted to the second hydraulic circuit 201 through the second hydraulic passage 212 and the fourth hydraulic passage 213, thereby operating the wheel cylinders 40 installed in the rear right wheel RR and the rear left wheel RL.

In this case, the third control valve 233 installed in the fourth hydraulic passage 214 may receive the opening signal from the ECU, thereby transmitting hydraulic pressure to the wheel cylinders 40.

The motor 120 and the power switching unit 130 of the hydraulic-pressure supply device 100 will hereinafter be described.

The motor 120 may produce rotational force according to an output signal of the ECU, and may produce rotational force in a forward or backward direction. A rotational angular speed and a rotation angle of the motor 120 may be precisely controlled. The motor 120 is well known to those skilled in the art, and as such a detailed description thereof will herein be omitted for convenience of description.

The ECU may control the motor 120 and valves 54, 60, 221*a*, 221*b*, 221*c*, 221*d*, 222*a*, 222*b*, 222*c*, 222*d*, 245, 261, and 262 included in the electric brake system 1 to be described later. A method for controlling the plurality of valves according to displacement of the brake pedal 10 will hereinafter be described in detail.

Driving force of the motor 120 may generate displacement of the hydraulic piston 114 through the power switching unit 130. Hydraulic pressure generated by the hydraulic piston 114 slidably moving within the pressure chamber may be transmitted to the wheel cylinders 40 respectively installed at the wheels RR, RL, FR, and FL through the hydraulic passages 211 and 214. The motor 120 may be implemented as a brushless motor composed of a stator 121 and a rotor 122.

The power switching unit 130 may convert rotational force into rectilinear movement. For example, the power switching unit 130 may include a worm shaft 131, a worm wheel 132, and a drive shaft 133.

The worm shaft 131 may be integrated with a rotational shaft of the motor 120. At least one worm may be formed at the outer circumference of the worm shaft 131 in a manner that the worm shaft 131 is meshed with the worm wheel 132 so that the worm wheel 132 can rotate. The worm wheel 132 may be meshed with the drive shaft 133 so that the drive shaft 133 performs rectilinear motion. The drive shaft 133 is connected to the hydraulic piston 114, such that the hydraulic piston 114 may slidably move within the cylinder block 111.

In more detail, a signal sensed by the pedal displacement sensor 11 due to displacement of the brake pedal 10 may be transmitted to the ECU, and the ECU may operate the motor 120 in one direction so that the worm shaft 131 may also rotate in one direction. Rotational force of the worm shaft 131 may be transmitted to the drive shaft 133 through the worm wheel 132, and the hydraulic piston 114 connected to the drive shaft 133 moves forward, so that hydraulic pressure occurs in the first pressure chamber 112.

In contrast, when a pedal effort is removed from the brake pedal 10, the ECU may operate the motor 120 in an opposite direction so that the worm shaft 131 may also rotate in the opposite direction. Accordingly, the worm wheel 132 may also rotate in the opposite direction, and the hydraulic piston 114 connected to the drive shaft 133 moves back to the original position thereof (by backward movement), thereby generating negative pressure in the first pressure chamber 112.

Meanwhile, hydraulic pressure and negative pressure may also occur in other directions opposite to the above-mentioned directions as necessary. In other words, a signal sensed by the pedal displacement sensor 11 due to displacement of the brake pedal 10 may be transmitted to the ECU, and the ECU may operate the motor 120 in an opposite direction so that the worm shaft 131 may also rotate in the opposite direction. Rotational force of the worm shaft 131 may be transmitted to the drive shaft 133 through the worm wheel 132, and the hydraulic piston 114 connected to the drive shaft 133 moves backward, so that hydraulic pressure occurs in the second pressure chamber 113.

In contrast, when a pedal effort is removed from the brake pedal 10, the ECU may operate the motor 120 in one direction so that the worm shaft 131 may also rotate in one direction. Accordingly, the worm wheel 132 may also rotate in the opposite direction, and the hydraulic piston 114 connected to the drive shaft 133 moves back to the original position thereof (by forward movement), thereby generating negative pressure in the second pressure chamber 113.

As described above, the hydraulic-pressure supply device 100 may transmit hydraulic pressure to the wheel cylinders 40 according to a rotation direction of rotational force generated by the motor 120. If hydraulic pressure occurs in the first pressure chamber 112 when the motor 120 rotates in one direction, negative pressure may occur in the second pressure chamber 113. In this case, hydraulic pressure from the reservoir 30 may be transmitted to the second pressure chamber 113 through the second dump passage 117, such that the negative pressure of the second pressure chamber 113 may be removed. Even when the motor 120 rotates in another direction, the operation for removing negative pressure from the first pressure chamber 112 can also be performed in the same manner as described above.

Although not shown in the drawings, the power switching unit 130 may be formed of a ball-screw-nut assembly. For example, the power switching unit 130 may include a screw that is integrated with a rotational shaft of the motor 120 or rotates with the rotational shaft of the motor 120, and a ball nut that is screw-coupled to the screw in a restricted rotation state and performs rectilinear motion according to rotation of the screw. The hydraulic piston 114 may be connected to the ball nut of the power switching unit 130, and may pressurize the pressure chamber by rectilinear movement of the ball nut. The above-mentioned ball-screw-nut assembly to convert rotational force into rectilinear motion is well known to those skilled in the art, and as such a detailed description thereof will herein be omitted.

In addition, the power switching unit 130 may be implemented not only as the ball-screw-nut assembly, but also as any structure capable of converting rotational force into rectilinear motion without departing from the scope and spirit of the present disclosure.

The electric brake system 1 according to the embodiment of the present disclosure may further include a first backup passage 251 and a second backup passage 252, each of which is configured to directly transmit oil discharged from the master cylinder 20 to the wheel cylinders 40 during abnormal operation of the electric brake system 1.

The first backup passage 251 may connect the first hydraulic port 24*a* to the first hydraulic circuit 201, and the second backup passage 252 may connect the second hydraulic port 24*b* to the second hydraulic circuit 202. The first backup passage 251 may be provided with the first cut valve 261 for controlling flow of oil, and the second backup passage 252 may be provided with the second cut valve 262 for controlling flow of oil.

The first and second cut valves 261 and 262 may be implemented as normally opened (NO) solenoid valves that remain opened in a normal state and then closed upon receiving a closing signal from the ECU.

The hydraulic control unit 200 according to the embodiment of the present disclosure will hereinafter be described.

The hydraulic control unit 200 may include a first hydraulic circuit 201 to control two wheels upon receiving hydraulic pressure, and a second hydraulic circuit 202 to control the two other wheels upon receiving hydraulic pressure. For example, the first hydraulic circuit 201 may control the rear right wheel RR and the rear left wheel RL. The second hydraulic circuit 202 may control the front right wheel FR and the front left wheel FL. The wheel cylinders 40 may be respectively installed in the four wheels FR, FL, RR, and RL, such that the wheel cylinders 40 may receive hydraulic pressure from the hydraulic-pressure supply device 100, resulting in braking of the vehicle.

The first hydraulic circuit 201 may be connected to the first hydraulic passage 211 and the fourth hydraulic passage 215 so as to receive hydraulic pressure from the hydraulic-pressure supply device 100, and the fourth hydraulic passage 215 may be divided into two passages that are respectively connected to the rear right wheel RR and the rear left wheel RL.

Likewise, the second hydraulic circuit 202 may be connected to the first hydraulic passage 211 and the third hydraulic passage 213 so as to receive hydraulic pressure from the hydraulic-pressure supply device 100, and the third hydraulic passage 213 may be divided into two passages that are respectively connected to the front right wheel FR and the front left wheel FL.

The first and second hydraulic circuits 201 and 202 may include a plurality of inlet valves 221 (221a, 221b, 221c, 221d) to control flow of hydraulic pressure. For example, the first hydraulic circuit 201 may be provided with two inlet valves 221a and 221b connected to the first hydraulic passage 211 such that the two inlet valves 221a and 221b may respectively control hydraulic pressures applied to two wheel cylinders 40. The second hydraulic circuit 202 may be provided with two inlet valves 221c and 221d connected to the third hydraulic passage 213 such that the two inlet valves 221c and 221d may respectively control hydraulic pressures applied to the wheel cylinders 40. In this case, the inlet valves 221 may be arranged upstream of the wheel cylinders 40 neighboring with the hydraulic-pressure providing unit 110. The inlet valves 221 may be implemented as normally opened (NO) solenoid valves that remain opened in a normal state and then closed upon receiving a closing signal from the ECU.

The first and second hydraulic circuits 201 and 202 may include check valves 223a, 223b, 223c, and 223d provided in bypass passages by which front ends and rear ends of the respective inlet valves 221a, 221 b, 221c, and 221d are connected to each other. The check valves 223a, 223b, 223c, and 223d may allow oil to flow from the wheel cylinders 40 to the hydraulic-pressure providing unit 110 and prevents oil from flowing from the hydraulic-pressure providing unit 110 to the wheel cylinders 40.

The first and second hydraulic circuits 201 and 202 may further include a plurality of outlet valves 222 (222a, 222b, 222c, 222d) connected to the reservoirs 31 and 33 (hereinafter referred to as 30) so as to improve performance or throughput when braking is released. The outlet valves 222 may be respectively connected to the wheel cylinders 40 so as to control hydraulic pressure discharged from the respective wheels RR, RL, FR, and FL. That is, the outlet valves 222 may sense brake pressures of the respective wheels RR, RL, FR, and FL. If decompression braking is needed, the outlet valves 222 may be selectively opened so as to control pressure. The outlet valves 222 may be implemented as normally opened (NO) solenoid valves that remain closed in a normal state and then opened upon receiving an opening signal from the ECU.

The hydraulic control unit 200 may be connected to the backup passages 251 and 252. For example, the first hydraulic circuit 201 may be connected to the first backup passage 251 so as to receive hydraulic pressure from the master cylinder 20, and the second hydraulic circuit 202 may be connected to the second backup passage 252 so as to receive hydraulic pressure from the master cylinder 20.

The first backup passage 251 may be linked to the first hydraulic circuit 201 at upstream sides (i.e., at the hydraulic-pressure providing unit) of the first and second inlet valves 221a and 221b. Likewise, the second backup passage 252 may be linked to the second hydraulic circuit 202 at upstream sides of the third and fourth inlet valves 221c and 221d. Therefore, hydraulic pressure supplied from the hydraulic-pressure providing unit 110 when the first and second cut valves 261 and 262 are closed may be supplied to the wheel cylinders 40 through the first and second hydraulic circuits 201 and 202. Hydraulic pressure supplied from the master cylinder 20 when the first and second cut valves 261 and 262 are opened may be supplied to the wheel cylinders 40 through the first and second backup passages 251 and 252. In this case, the plurality of inlet valves 221a, 221b, 221c, and 221d remain opened, so that operation states of the inlet valves 221a, 221b, 221c, and 221d need not be changed.

Meanwhile, reference numerals 'PS1-1' and 'PS1-2' not illustrated are a hydraulic-passage pressure sensor to sense hydraulic pressure of the first hydraulic circuit 201 and a hydraulic-passage pressure sensor to sense hydraulic pressure of the second hydraulic circuit 202, respectively. Reference numeral 'PS2' not illustrated is a backup-passage pressure sensor to measure oil pressure of the master cylinder 20, and reference numeral 'MPS' not illustrated is a motor control sensor to control either a rotation angle of the motor 120 or a current of the motor 120. If necessary, only one of PS1-1 and PS1-2 may be used in the embodiment of the present disclosure.

Operations of the electric brake system 1 according to the embodiment of the present disclosure will hereinafter be described in detail.

FIG. 3 is a hydraulic circuit diagram illustrating a normal braking state of the electric brake system 1 according to an embodiment of the present disclosure. It is possible to additionally perform regenerative braking cooperative control when the electric brake system 1 normally performs braking of the vehicle. A regenerative braking cooperative control method will hereinafter be described in detail.

Referring to FIG. 3, when braking is started by the driver, the amount of braking desired by the driver may be sensed through the pedal displacement sensor 11 based on the information about pressure applied to the brake pedal 10 depressed by the driver. The ECU 510 may receive an electrical signal output from the pedal displacement sensor 11, and may operate the motor 120.

In addition, the ECU may receive the magnitude of regenerative braking through a backup-passage pressure sensor PS2 arranged at the outlet of the master cylinder 20 and the first and second hydraulic-passage pressure sensors PS11 and PS12 arranged at the first and second hydraulic circuits 201 and 202, and may calculate the magnitude of frictional braking according to a difference between the braking desired by the driver and the regenerative braking. Thereby, the ECU may recognize the magnitude of increase or decrease in pressure at the wheel cylinders 40.

In more detail, when the driver depresses the brake pedal 10 at the initial stage of braking, the motor 120 operates, the rotational force of the motor 120 is transmitted to the pressure providing unit 110 by the power switching unit 130, and hydraulic pressure discharged from the pressure providing unit 110 is transmitted to the first hydraulic passage 211. Specifically, hydraulic pressure discharged from the pressure providing unit 110 during braking of the vehicle may be transmitted to the first hydraulic circuit 201 through the fourth hydraulic passage 215, after the third control valve 233 installed in the fourth hydraulic passage 215 branched from the first hydraulic passage 211 is opened by an output signal of the ECU.

Meanwhile, when the hydraulic-pressure supply device 100 generates hydraulic pressure, the first and second cut valves 261 and 262 respectively installed in the first and second backup passage 251 and 252 respectively connected to the first and second hydraulic ports 24a and 24b of the master cylinder 20 are closed, such that hydraulic pressure discharged from the master cylinder 20 may not be transmitted to the wheel cylinders 40.

In addition, hydraulic pressure discharged from the hydraulic-pressure supply device 100 may be transmitted to the wheel cylinders 40 respectively installed in the wheels RR, RL, FR, and FL due to the opened inlet valves 221, resulting in occurrence of braking force. In this case, if pressure applied to each of the first and second hydraulic circuits 201 and 202 is higher than a target pressure value based on a pedal effort of the brake pedal 10, a release valve 233 is opened so that the generated pressure can move to follow the target pressure value.

Meanwhile, pressure generated from the master cylinder 20 pressurized in response to a pedal effort applied to the brake pedal 10 may be transferred to the simulation device 50 connected to the master cylinder 20. In this case, the normally closed (NC) simulator valve 54 arranged at the rear end of the simulation chamber 51 is opened such that oil filling the simulation chamber 51 is transmitted to the reservoir 30 through the simulator valve 54. In addition, the reaction force piston 52 moves and pressure corresponding to a weight of the reaction force spring 53 supporting the reaction piston 52 is formed in the simulation chamber 51, resulting in formation of proper pedal feel for the driver.

The above-mentioned description has disclosed a circuit diagram of the electric brake system 1 based on regenerative braking.

A block diagram of the electric brake system 1 based on regenerative braking cooperative control according to the embodiment of the present disclosure will hereinafter be described in detail.

Figure 4:
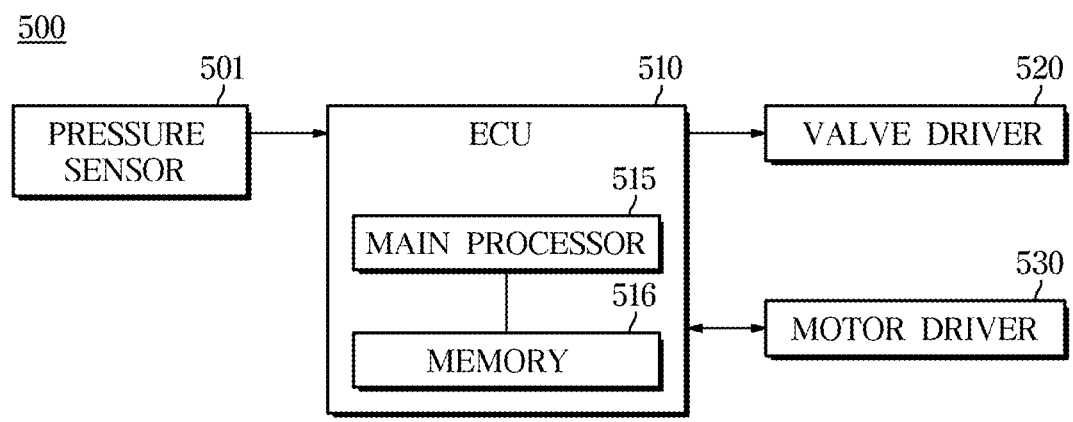
FIG. 4 is a block diagram illustrating an electric brake system according to an embodiment of the present disclosure.

FIG. 4 is a block diagram illustrating an electric brake system based on regenerative braking cooperative control according to the embodiment of the present disclosure. Referring to FIG. 4, the electric brake system 500 for a vehicle may include a pressure sensor 501, an electric control unit (ECU) 510 for overall control of the electric brake system 500, a valve driver 520 controlled by the ECU 510, and a motor driver 530 controlled by the ECU 510.

The pressure sensor 501 may include a plurality of pressure sensors as shown in the electric brake system 1 of FIG. 2. In more detail, sensors included in the pressure sensor 501 may include sensors PS11, PS12, PS2, and MPS and the pedal displacement sensor 11 as shown in FIG. 2. The valve driver 520 may include a plurality of valves. In more detail, all valves included in the circuit diagram of the electric brake system 1 of FIG. 2 may be included in the valve driver 520, and may thus be opened or closed by a control signal of the ECU 510.

The motor driver 530 may operate the motor 120 included in the circuit diagram of the electric brake system 1 shown in FIG. 2.

In more detail, the motor driver 530 may operate the motor 120 upon receiving a control signal from the ECU 510. That is, the signal sensed by the pedal displacement sensor 11 due to displacement of the brake pedal 10 of FIG. 2 may be transmitted to the ECU 510, the ECU 510 may rotate the worm shaft 131 in one direction by driving the motor 120 in one direction, rotational force of the worm shaft 131 may be transmitted to the drive shaft 133 through the worm wheel 132, and hydraulic pressure may occur in the pressure chamber 111 by movement of the hydraulic piston 112 connected to the drive shaft 133.

The ECU 510 included in the electric brake system 1 so as to control the motor 120 and various valves will hereinafter be described in detail. The ECU 510 may include a main processor 515 for overall control of the electric brake system 1, and a memory 516 to store various programs and control methods therein.

The main processor 71 may calculate pressure needed for opening or closing of the valves, pressure needed for front wheels, and pressure needed for rear wheels on the basis of pressure information received from the pressure sensor 501, such that the main processor 71 may control the opening or closing of the valves and the driving force of the motor.

The main processor 71 may convert a braking pressure value acquired from the pressure sensor 501 into a braking torque as represented by the following equation 1, and may determine whether rear-wheel regenerative braking cooperative control or front-wheel and rear-wheel regenerative cooperative control is needed, or may determine whether such cooperative control need not be used, as represented by the following equation 2.

Total Brake Torque=Total Brake Pressure×(Torque Factor)     [Equation 1]

Total Brake Torque=Rear-wheel motor torque+Front Brake Pressure Torque+Rear Brake Pressure Torque     [Equation 2]

In Equation 1 and Equation 2, the total brake pressure may be a braking pressure value obtained from the pressure sensor 501, the torque factor may be a factor (or a coefficient) denoted by the sum of a front torque factor and a rear torque factor, the front brake pressure torque may be denoted by a product of the front brake pressure and the front torque factor, and the rear brake pressure torque may be denoted by a product of the rear brake pressure and the rear torque factor.

Therefore, the main processor 71 may calculate the necessary rear-wheel motor torque using Equation 2, and may thus determine whether rear-wheel regenerative braking cooperative control or front-wheel and rear-wheel regenerative cooperative control is needed, or may determine whether such cooperative control need not be used, as represented by Equation 2.

FIGS. 5 to 8 are graphs illustrating methods for controlling the electric brake system based on regenerative braking cooperative control according to the embodiment of the present disclosure.

Referring to FIGS. 5 to 8, a dotted graph "1" may indicate front brake pressure (i.e., front-wheel hydraulic pressure) changing with time, a solid graph "2" may indicate regenerative braking pressure changing with time, a dash-dotted line "3" may indicate the driver's braking pressure (brake pressure value) changing with time, and a thick solid line "4" may indicate rear-wheel brake pressure (i.e., rear-wheel hydraulic pressure).

Figure 5:
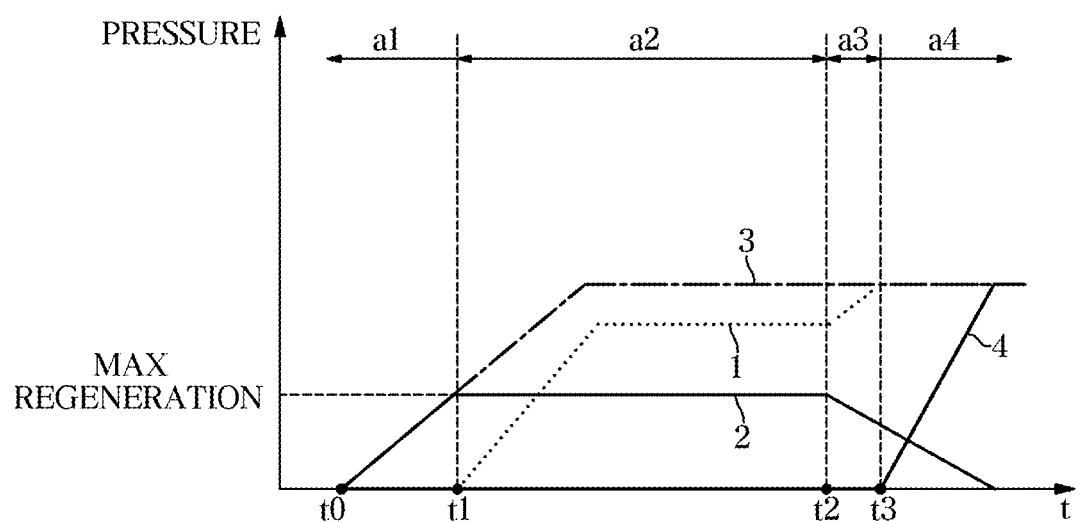
FIG. 5 is a graph illustrating a method for controlling an electric brake based on regenerative braking cooperative control according to an embodiment of the present disclosure.

As shown in FIG. 5, the electric brake system 1 according to the embodiment of the present disclosure may release rear-wheel regenerative braking by pressurizing front wheels and rear wheels at different times.

In more detail, as soon as the driver's braking pressure starts increasing at a time point t0[sec] as shown in the graph "3", the ECU 510 may perform regenerative braking from the time point t0[sec]. However, the amount of regenerative braking may have the maximum amount of regenerative braking (MAX regeneration), such that the ECU may increase the front-wheel brake pressure when the regenerative braking pressure reaches the MAX regeneration at a time point t1[sec].

As can be seen from the hydraulic circuit diagram 1 of the electric brake system shown in FIG. 2, the second control valve 231 may be opened at the time point t1[sec], such that hydraulic pressure may occur in each of the front left wheel FL and the front right wheel FR included in the second hydraulic circuit 202.

In more detail, the front-wheel brake pressure may be added to the regenerative braking pressure such that the resultant front-wheel brake pressure may increase to a specific value where the driver's braking pressure occurs. Thereafter, the ECU 510 may control the front-wheel brake pressure to remain unchanged.

As can be seen from the hydraulic circuit diagram 1 of the electric brake system shown in FIG. 2, the third control valve 233 may be opened at a time point t2 [sec], such that hydraulic pressure may be transmitted to the rear left wheel RL and the rear right wheel RR included in the first hydraulic circuit 201. After lapse of a time point t3[sec], hydraulic pressure is formed as shown in FIG. 5.

Specifically, since the regenerative braking pressure decreases during release of regenerative braking, the ECU 510 may additionally increase the front-wheel brake pressure. If the additionally increased front-wheel brake pressure is identical to the driver's braking pressure at a time point t3[sec], the ECU 510 may further increase the rear-wheel brake pressure, such that the fourth control valve 235 included in the hydraulic circuit diagram is opened, thereby increasing hydraulic pressure applied to rear wheels contained in the first hydraulic circuit 201.

Therefore, the ECU 510 may perform braking of the vehicle only using regenerative braking ranging from the driver's braking start point to the regenerative braking MAX value (see the section "a1").

During a subsequent time (i.e., the section "a2") ranging from the regenerative braking MAX value to the regenerative braking release time, the ECU 510 may perform braking of the vehicle only using regenerative braking and front-wheel brake pressure control.

Thereafter, during a subsequent time (i.e., the section "a3") ranging from the regenerative braking release time to a specific point where the front-wheel brake pressure is identical to the driver's braking pressure, the ECU 510 may pressurize front wheels. Thereafter, the ECU 510 may sequentially pressurize rear wheels.

In this case, regenerative braking may be performed for rear wheels. During rear-wheel regenerative braking, hydraulic pressure control is applied only to front wheels, and rear wheels are braked by the motor, such that over-braking of the rear wheels is minimized, thereby guaranteeing vehicle safety.

Figure 6:
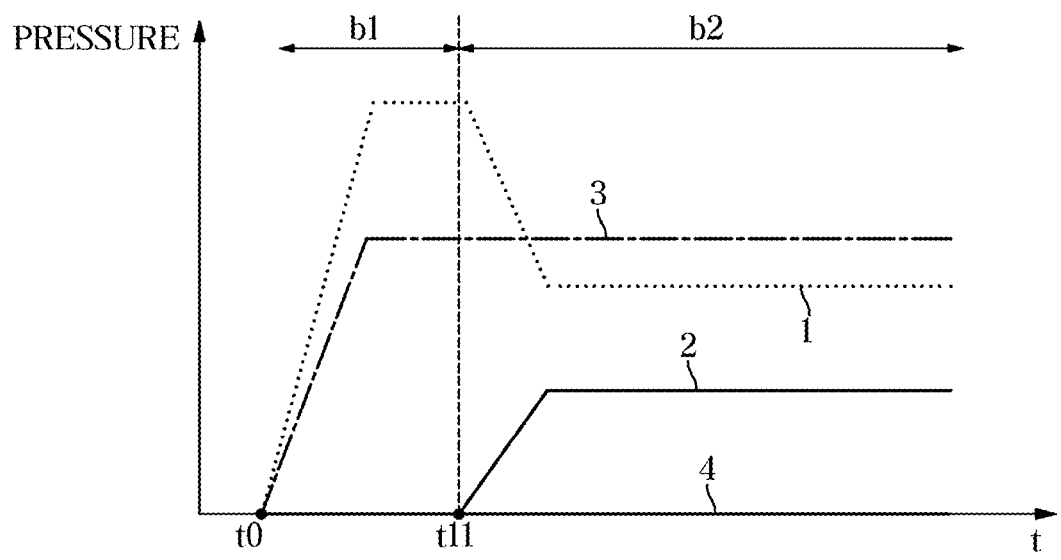
FIG. 6 is a graph illustrating a method for controlling an electric brake based on regenerative braking cooperative control according to another embodiment of the present disclosure.
Figure 7:
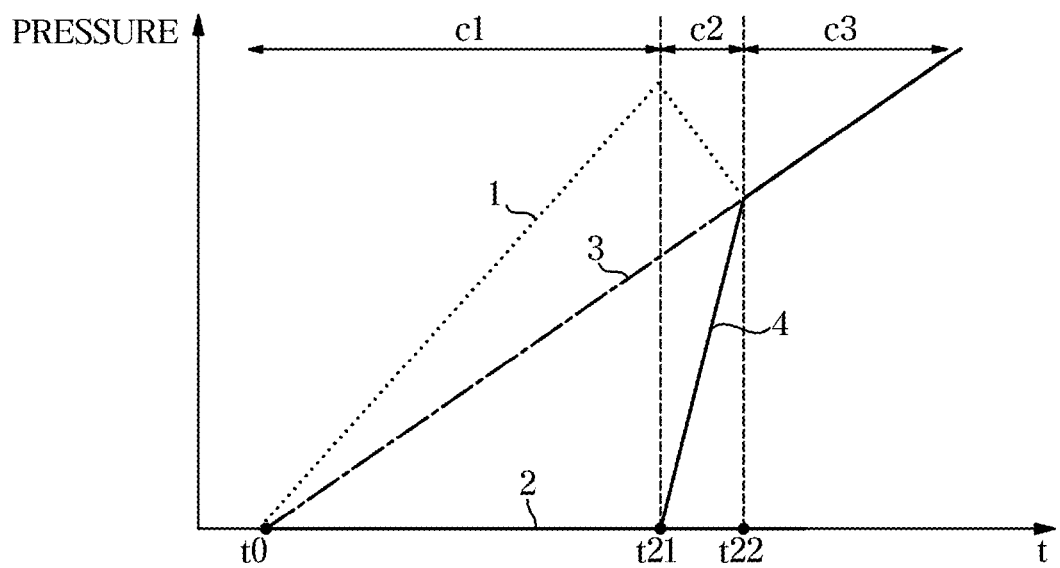
FIG. 7 is a graph illustrating a method for controlling an electric brake based on regenerative braking cooperative control according to still another embodiment of the present disclosure.

FIGS. 6 and 7 are graphs illustrating regenerative braking cooperative control when the degree of deceleration caused by the driver's intention is considered high.

Referring to FIG. 6, assuming that regenerative braking is not performed, the ECU 510 may increase front-wheel brake pressure more rapidly than variation of the driver's braking pressure. Thereafter, when regenerative braking is performed at a time point t11[sec], the ECU 510 may reduce the front-wheel brake pressure in a manner that the sum of the front-wheel brake pressure and the regenerative braking pressure is identical to the driver's braking pressure.

For example, when variation of the driver's braking pressure is higher than a predetermined slope (i.e., a first threshold value), regenerative braking may not be carried out. In this case, the first threshold value may be based on variation of brake pressure changing with time.

Therefore, when the driver's braking pressure is abruptly changed from the driver's braking start time, the ECU 510 may brake the vehicle only using the front-wheel hydraulic pressure until reaching the section "b1" in which the variation of the driver's braking pressure becomes constant.

Thereafter, when the driver's braking pressure becomes constant at a time point t11[sec], the ECU 510 may start regenerative braking, and may thus reduce the front-wheel hydraulic pressure due to starting of regenerative braking during the section "b2". As a result, front wheels may be over-braked in any section in which regenerative braking is not performed.

In another example, when regenerative braking is not performed as shown in FIG. 7, the ECU 510 may increase the front-wheel brake pressure more rapidly than variation of the driver's braking pressure (see the section c1). In this case, in order to address over-braking of the front wheels, when front-wheel brake pressure reaches a second threshold value, the ECU 510 may pressurize rear wheels.

In this case, the second threshold value may be based on a hydraulic pressure value [bar]. In other words, the ECU 510 may increase the rear-wheel brake pressure from a time point t21[sec] at which the front-wheel hydraulic pressure reaches a second threshold value, and may reduce the front-wheel brake pressure until reaching the driver's braking pressure because the front-wheel brake pressure is in an over-braked state. Therefore, the ECU 510 may synchronize each of the front-wheel brake pressure and the rear-wheel brake pressure with the driver's braking pressure.

The ECU 510 may adjust the decrease variation of the front-wheel brake pressure and the decrease variation of the rear-wheel brake pressure in different ways in a manner that the front-wheel brake pressure and the rear-wheel brake pressure can be synchronized with the driver's braking pressure at the same time after the front-wheel hydraulic pressure reaches the second threshold value.

Therefore, the ECU 510 may perform braking of the vehicle only using the front-wheel brake pressure in the range from the driver's braking start time to the second threshold value of the front-wheel brake pressure (see the section c1).

After the front-wheel brake pressure reaches the second threshold value, the ECU 510 may synchronize the front-wheel brake pressure and the rear-wheel brake pressure within the predetermined section "c2".

After lapse of a time point t22[sec] at which the front-wheel brake pressure and the rear-wheel brake pressure are synchronized, the ECU 510 may prevent regenerative braking and may perform only front-wheel control and rear-wheel control.

Figure 8:
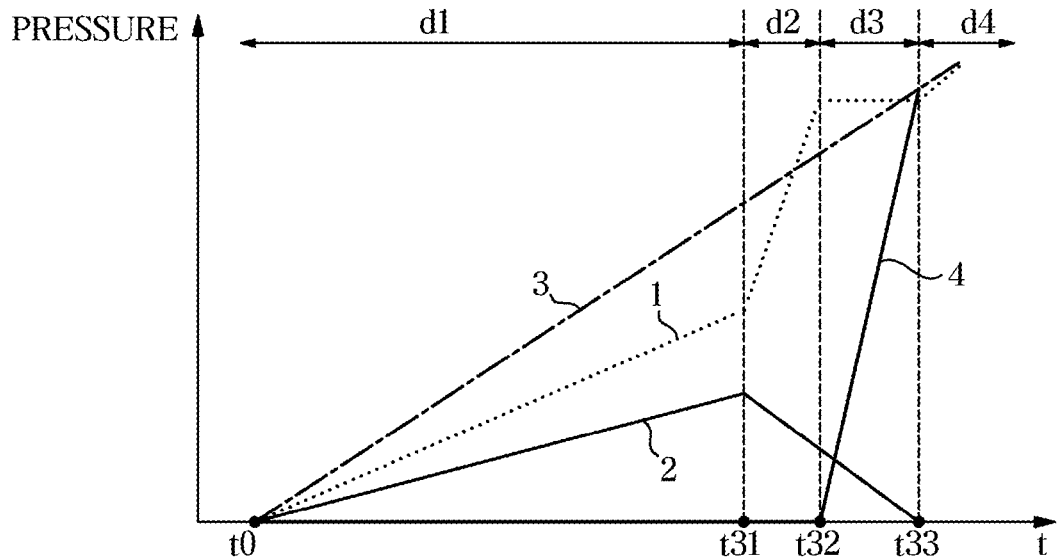
FIG. 8 is a graph illustrating a method for controlling an electric brake based on regenerative braking cooperative control according to still another embodiment of the present disclosure.

In another example, as shown in FIG. 8, the ECU 510 may increase front-wheel hydraulic pressure and rear-wheel hydraulic pressure at different times during release of such regenerative braking cooperative control.

In more detail, as can be seen from FIG. 8, when the driver's braking pressure abruptly increases so that it is impossible to adjust the driver's braking pressure only using regenerative braking, the ECU 510 may control regenerative braking pressure and front-wheel brake pressure at the same time, resulting in braking of the vehicle.

If regenerative braking is released at a time point t21 during continuous increase of the driver's braking pressure, the ECU 510 may abruptly increase the front-wheel brake pressure and may then pressurize the rear wheels.

However, the ECU 510 may first increase the front-wheel brake pressure to a third threshold value higher than the driver's braking pressure during release of rear-wheel regenerative braking, and may then increase the rear-wheel hydraulic pressure.

In this case, the third threshold value may be based on a hydraulic pressure value [bar].

The third threshold value may be identical to the driver's braking pressure to be predicted at the end point t33[sec] of regenerative braking.

Therefore, the ECU 510 may perform regenerative braking cooperative control only using the front-wheel brake pressure in the range from the driver's braking start point to the regenerative braking release time (see the section d1).

Thereafter, the ECU 510 may pressurize front wheels and then pressurize rear wheels. In this case, the third threshold value indicating a target front-wheel pressure may be higher than the driver's braking pressure (see the section d2).

Thereafter, the ECU 510 may increase the rear-wheel brake pressure from a specific time at which the front-wheel brake pressure reaches a third threshold value, such that the ECU 510 may synchronize the front-wheel brake pressure and the rear-wheel brake pressure with the driver's brake pressure (see the section d3).

The above-mentioned description has disclosed constituent elements needed for regenerative braking cooperative control of the electric brake system 1 and the operations thereof.

A regenerative braking cooperative control method for use in the electric brake system 1 according to the embodiment of the present disclosure will hereinafter be described.

Figure 9:
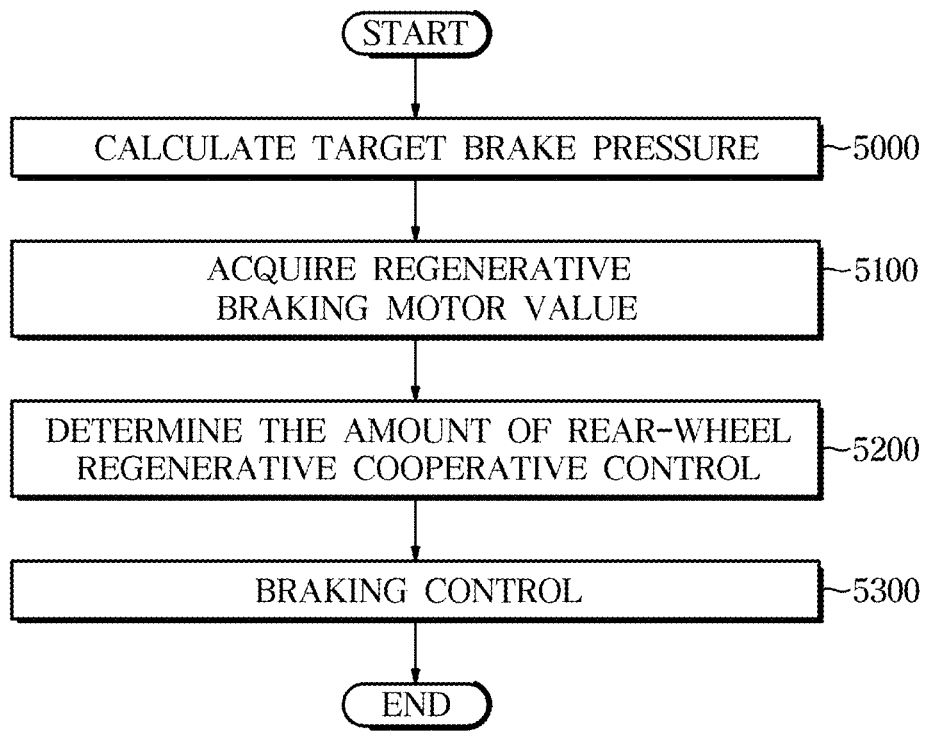
FIG. 9 is a flowchart illustrating a method for controlling an electric brake based on regenerative braking cooperative control according to an embodiment of the present disclosure.

FIG. 9 is a flowchart illustrating a regenerative braking cooperative control method according to the embodiment of the present disclosure.

Referring to FIG. 9, when the driver performs braking of the vehicle, the ECU 510 may calculate a target brake pressure based on the driver's deceleration intention (5000). The ECU 510 may acquire a regenerative braking motor value (5100). Thereafter, the ECU 510 may determine the amount of necessary rear-wheel regenerative braking cooperative control based on the acquired regenerative braking motor value (5200).

In more detail, the ECU 510 may determine the amount of such control on the basis of Equation 1 and Equation 2 so as to determine the amount of necessary rear-wheel regenerative braking cooperative control.

In this case, upon receiving the determined rear-wheel regenerative braking cooperative control amount, the ECU 510 may determine whether rear-wheel regenerative braking cooperative control or front-wheel and rear-wheel regenerative cooperative control is needed, or may determine whether such cooperative control need not be used.

Therefore, the ECU 510 may perform braking control according to the determined situation (5300).

Figure 10:
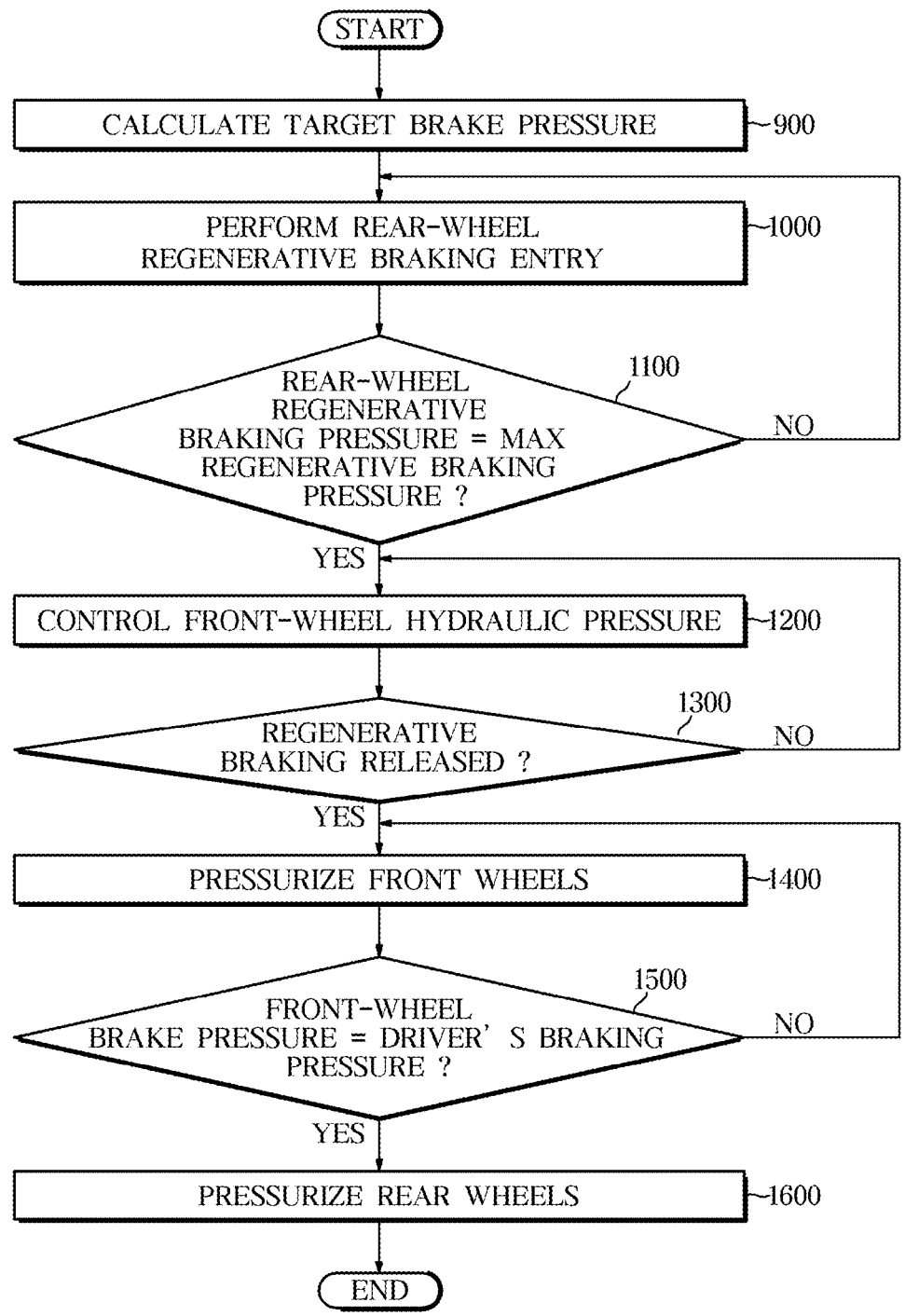
FIG. 10 is a flowchart illustrating a method for controlling an electric brake based on regenerative braking cooperative control according to another embodiment of the present disclosure.
Figure 11:
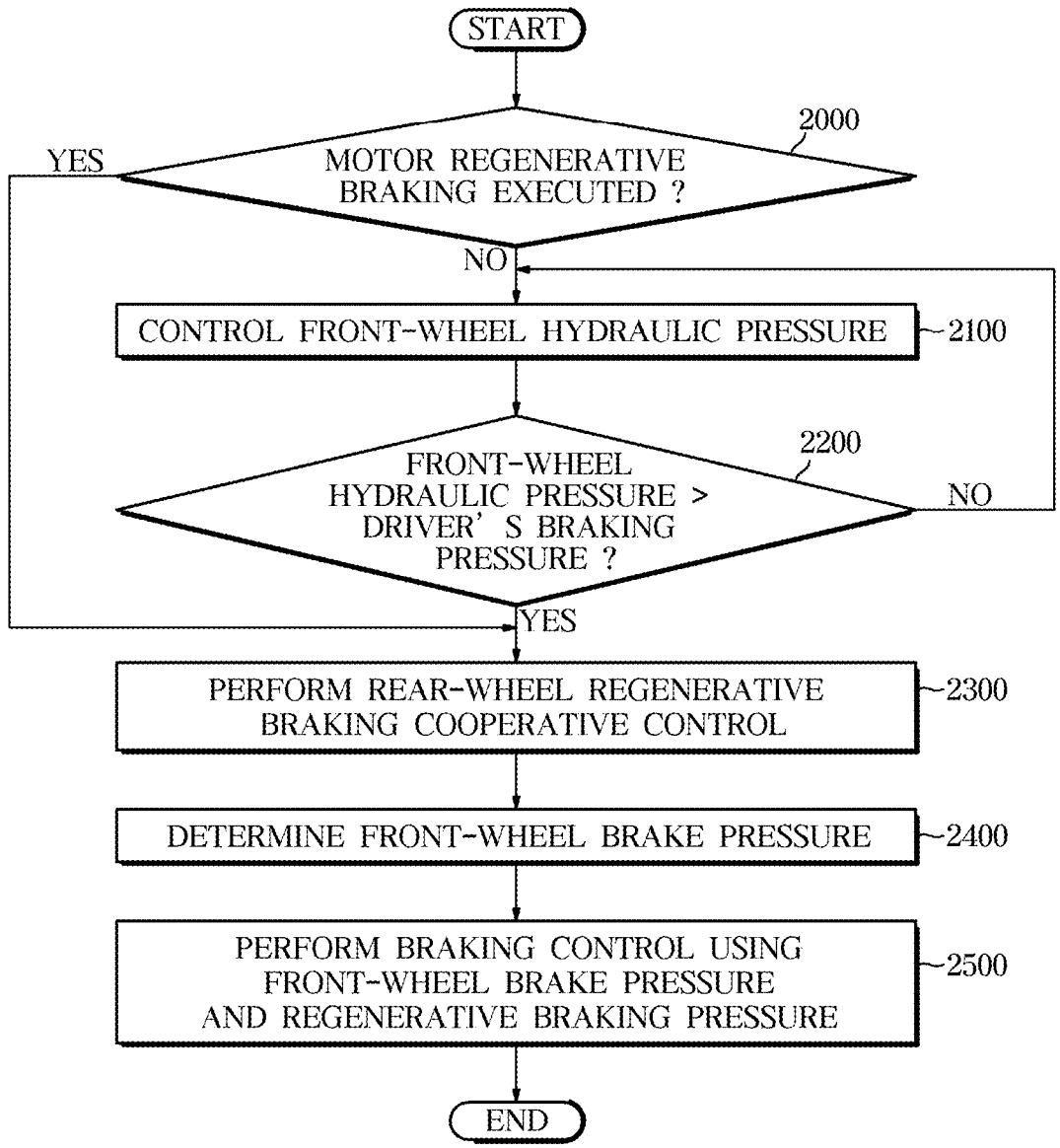
FIG. 11 is a flowchart illustrating a method for controlling an electric brake based on regenerative braking cooperative control according to still another embodiment of the present disclosure.
Figure 12:
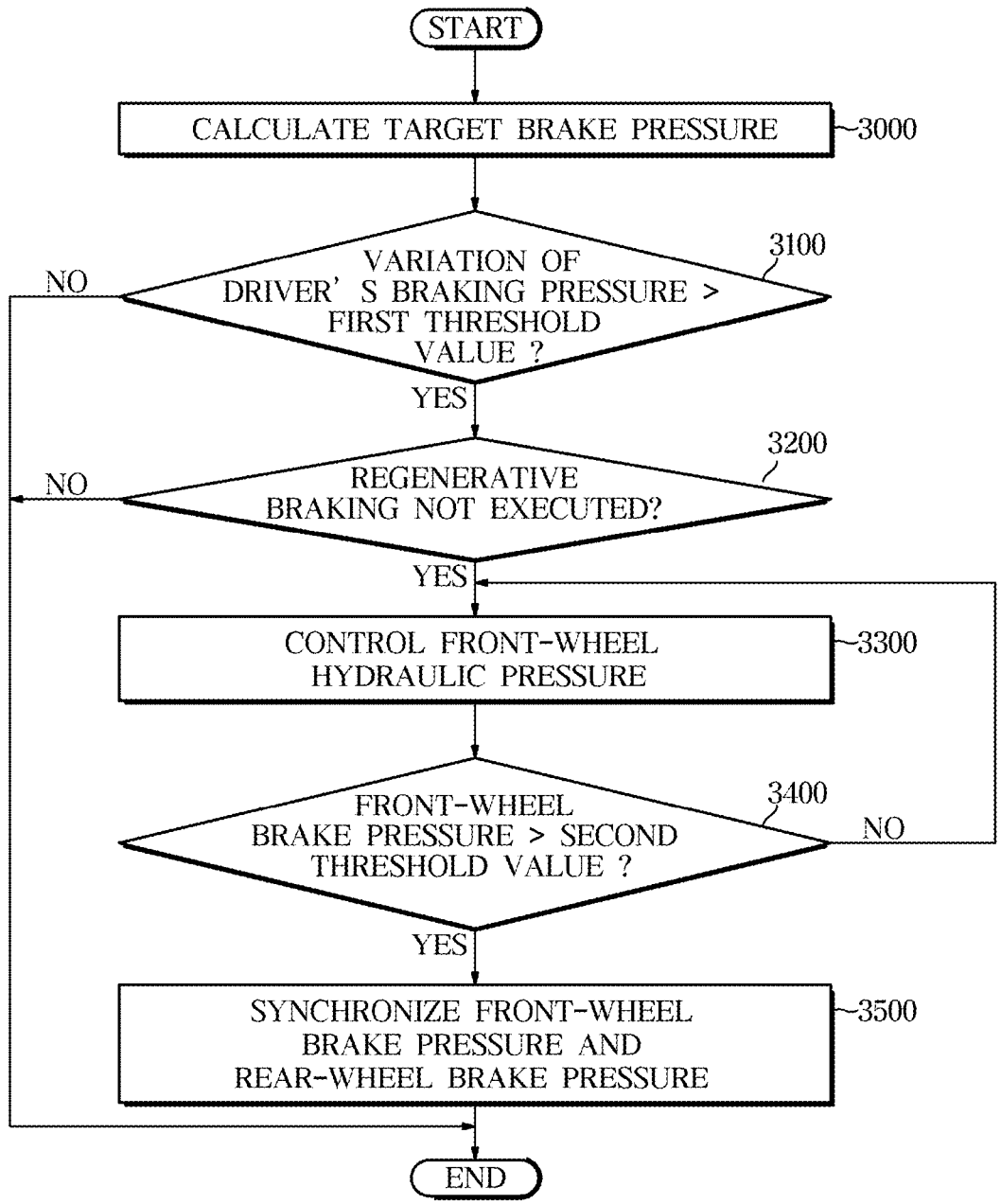
FIG. 12 is a flowchart illustrating a method for controlling an electric brake based on regenerative braking cooperative control according to still another embodiment of the present disclosure.

FIGS. 10 to 12 are flowcharts illustrating cooperative control methods based on the situations decided by the ECU 510.

However, it should be noted that the first to third threshold values shown in FIGS. 5 to 8 may be different from first to third threshold values shown in FIGS. 9 to 12 as necessary.

In more detail, FIGS. 10 to 13 are flowcharts illustrating regenerative braking cooperative control methods according to the embodiment of the present disclosure.

Referring to FIG. 10, since the driver performs braking of the vehicle, regenerative braking cooperative control according to the present disclosure starts operation (900). In more detail, when the driver performs braking of the vehicle, the pedal displacement sensor 11 configured to measure a pedal effort applied to the pedal may sense the driver's braking pressure. If the target brake pressure based on the driver's braking intention is calculated, the ECU 510 may perform rear-wheel regenerative braking entry control (1000). In this case, when the rear-wheel regenerative braking pressure reaches the maximum regenerative braking pressure (MAX regeneration) (YES in 1100), the ECU 510 may control front-wheel hydraulic pressure (1200). In more detail, the front-wheel hydraulic pressure control may refer to a control method for increasing the front-wheel brake pressure so as to synchronize the front-wheel hydraulic pressure with the driver's braking pressure.

In this case, when regenerative braking is released (YES in 1300), the ECU 510 may further pressurize the front wheels so that the front-wheel brake pressure may be synchronized with the driver's braking pressure. In this case, the ECU 510 may pressurize the rear wheels (1600) when the front-wheel brake pressure reaches the driver's braking pressure (YES in 1500).

Figure 13:
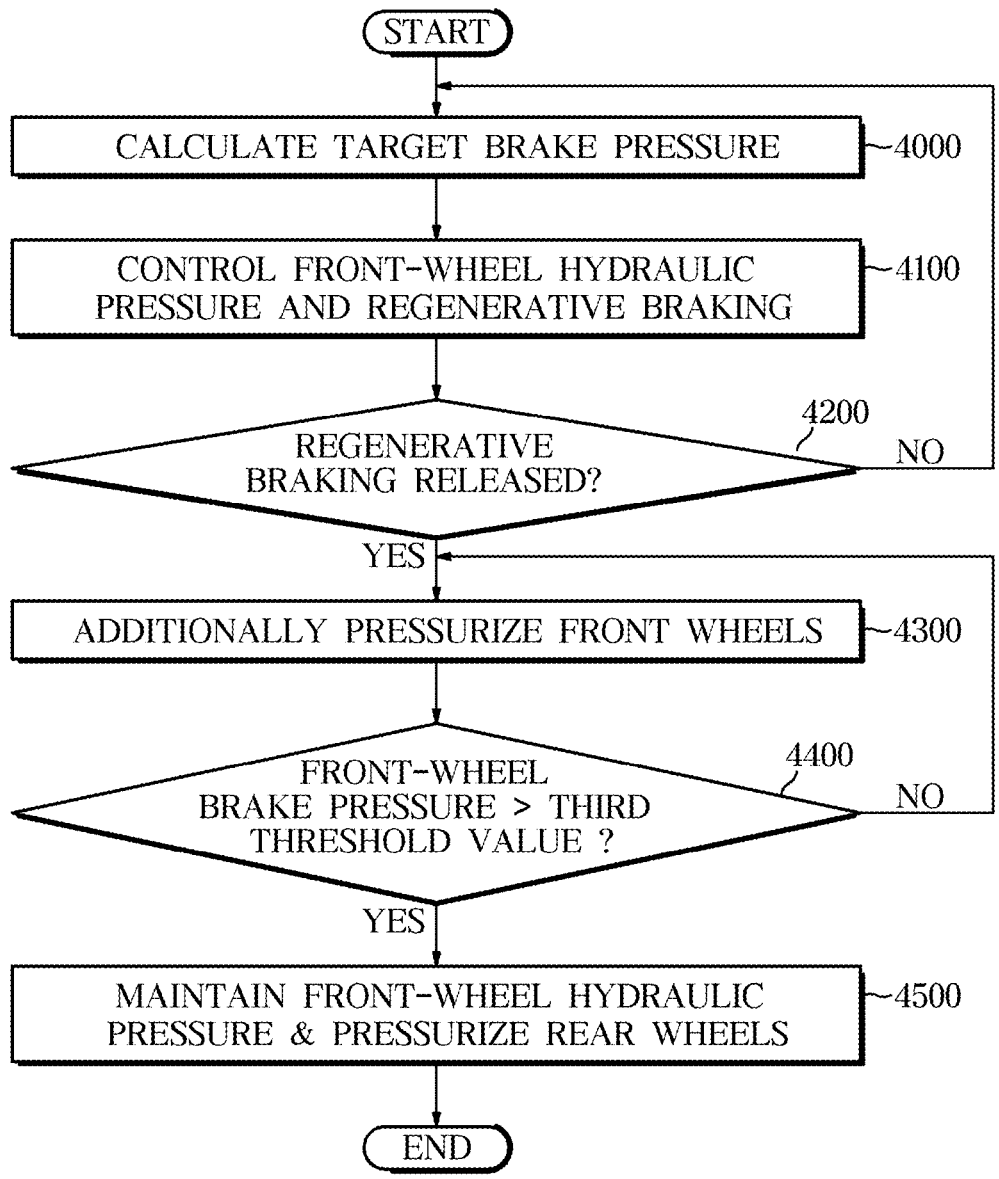
FIG. 13 is a flowchart illustrating a method for controlling an electric brake based on regenerative braking cooperative control according to still another embodiment of the present disclosure.

FIGS. 11 to 13 are flowcharts illustrating control methods for use in a case in which the driver suddenly performs braking control of the vehicle. In this case, although not shown in the drawings, information as to whether the driver suddenly performs braking control may correspond to an exemplary case in which variation in pedal effort is higher than a predetermined threshold value.

Referring to FIG. 11, when regenerative braking of the motor is not performed (NO in 2000) when the driver suddenly performs braking control, the ECU 510 may perform braking control only using front-wheel hydraulic pressure.

In this case, when the front-wheel hydraulic pressure is higher than the driver's braking pressure (YES in 2200), the ECU 510 may perform rear-wheel regenerative braking cooperative control (2300). Thereafter, the ECU 510 may determine the front-wheel brake pressure (2400) in a manner that the front-wheel hydraulic pressure is reduced in response to execution of rear-wheel regenerative braking cooperative control. In more detail, the front-wheel brake pressure may be determined in a manner that the sum of front-wheel brake pressure and the regenerative braking pressure is identical to the driver's braking pressure.

Thereafter, the ECU 510 may perform braking control according to the determined front-wheel brake pressure and the determined regenerative braking pressure (2500).

Referring to FIG. 12, when the driver performs braking of the vehicle, the ECU 510 may calculate a target brake pressure based on the driver's deceleration intention (3000). When variation of the driver's braking pressure is higher than a first threshold value (YES in 3100) and regenerative braking is not performed (YES in 3200), the ECU 510 may control front-wheel hydraulic pressure (3300).

In this case, front-wheel hydraulic pressure control may be controlled in a manner that front-wheel hydraulic pressure is in an over-braked state as compared to the driver's braking pressure, resulting in increased brake pressure.

Thereafter, when the front-wheel brake pressure is higher than a second threshold value (YES in 3400), the ECU 510 may synchronize front-wheel brake pressure and rear-wheel brake pressure (3500). In more detail, the ECU 510 may reduce the front-wheel brake pressure, and may increase the rear-wheel brake pressure, such that each of the front-wheel brake pressure and the rear-wheel brake pressure is identical to the driver's braking pressure.

Finally, as shown in FIG. 13, if the driver performs braking of the vehicle (4000) and front-wheel hydraulic pressure control and regenerative braking control are cooperatively controlled (4100), the ECU 510 may further pressurize front wheels (4300) when regenerative braking is released (YES in 4200). In this case, when the front-wheel brake pressure is higher than a third threshold value (YES in 4400), the ECU 510 may maintain the front-wheel hydraulic pressure and pressurize rear wheels, resulting in synchronization of the front-wheel brake pressure and the rear-wheel brake pressure.

As is apparent from the above description, the electric brake system and the method for controlling the same according to the embodiments of the present disclosure may control and distribute braking pressure of front wheels and braking pressure of rear wheels for use in a rear-wheel regenerative braking vehicle.

The electric brake system and the method for controlling the same according to the embodiments of the present disclosure may prevent front wheels or rear wheels from being overbraked, resulting in a stable posture of the vehicle.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electric brake system for a vehicle comprising:
   a calculator configured to calculate a target brake pressure based on a pedal effort sensed by a pedal sensor of the vehicle;
   a first hydraulic circuit configured to form a brake pressure of at least one rear wheel;
   a second hydraulic circuit configured to form a brake pressure of at least one front wheel; and
   a controller configured to perform cooperative control during deceleration of a vehicle,
   wherein the controller is configured to:
      control the second hydraulic circuit to form the brake pressure of a front-wheel hydraulic pressure when a rear-wheel regenerative braking torque reaches a maximum regenerative braking torque; and
      in response to the rear-wheel regenerative braking torque being reduced, increase the front-wheel hydraulic pressure to the target brake pressure and then increase a rear-wheel hydraulic pressure after increasing the front-wheel hydraulic pressure.

2. The electric brake system according to claim 1, wherein the controller is configured to, when performing the cooperative control of the front-wheel hydraulic pressure, increase the front-wheel hydraulic pressure to a first threshold value.

3. The electric brake system according to claim 1, wherein:
   the controller is configured to, when performing the cooperative control, increase the front-wheel hydraulic pressure so as to form the amount of a braking torque corresponding to a difference between a braking torque based on driver's deceleration intention and a maximum regenerative braking torque.

4. The electric brake system according to claim 1, wherein the controller is configured to increase the front-wheel hydraulic pressure to the target brake pressure, and then increase the rear-wheel hydraulic pressure to the target brake pressure after increasing the front-wheel hydraulic pressure to the target brake pressure.

5. The electric brake system according to claim 1, wherein the controller is configured to perform deceleration of the vehicle by controlling only the front-wheel hydraulic pressure when variation of a sensed driver's braking pressure is higher than a second threshold value.

6. The electric brake system according to claim 5, wherein the controller is configured to perform the rear-wheel regenerative braking when the front-wheel hydraulic pressure reaches a third threshold value.

7. The electric brake system according to claim 6, wherein:
   the controller is configured to, when the rear-wheel regenerative braking pressure reaches the maximum regenerative braking pressure, increase the front-wheel hydraulic pressure in a manner that a sum of a front-wheel torque and a maximum regenerative brake torque is identical to the target brake torque.

8. The electric brake system according to claim 5, wherein:
   the controller is configured to, when the front-wheel hydraulic pressure exceed a fourth threshold value, increase the rear-wheel hydraulic pressure to the target brake pressure, and reduce the front-wheel hydraulic pressure to the target brake pressure.

9. The electric brake system according to claim 8, wherein the controller is configured to allow a consumption time needed to increase the rear-wheel hydraulic pressure to the target brake pressure to be identical to another consumption time needed to reduce the front-wheel hydraulic pressure to the target brake pressure when the controller increases the rear-wheel hydraulic pressure to the target brake pressure and reduces the front-wheel hydraulic pressure to the target brake pressure.

10. The electric brake system according to claim 8, wherein the controller is configured to, when the front-wheel hydraulic pressure exceeds the fourth threshold value, not to perform the rear-wheel regenerative braking.

11. The electric brake system according to claim 9, wherein the controller is configured to, when the front-wheel hydraulic pressure exceeds the third threshold value after the rear-wheel regenerative braking is released, not to perform the rear-wheel regenerative braking.

12. A method for controlling an electric brake system of a vehicle, the method comprising:
    calculating a target brake pressure based on a pedal effort sensed by a pedal sensor of the vehicle;

controlling either a first hydraulic circuit that forms a brake pressure of at least one rear wheel or a second hydraulic circuit that forms a brake pressure of at least one front wheel; and performing cooperative control during deceleration of the vehicle, wherein the performing of the cooperative control comprises:

controlling the second hydraulic circuit to form the brake pressure of a front-wheel hydraulic pressure when the rear-wheel regenerative braking torque reaches a maximum regenerative braking torque; and in response to the rear-wheel regenerative braking torque being reduced, increasing the front-wheel hydraulic pressure to the target brake pressure and then increasing a rear-wheel hydraulic pressure after increasing the front-wheel hydraulic pressure.

13. The method according to claim 12, wherein the increasing the rear-wheel hydraulic pressure includes:

synchronizing the front-wheel hydraulic pressure and the rear-wheel hydraulic pressure by increasing the rear-wheel hydraulic pressure to the target brake pressure.

* * * * *